United States Patent
Tran et al.

(10) Patent No.: US 12,540,919 B2
(45) Date of Patent: Feb. 3, 2026

(54) METHOD FOR ENHANCING SIGNALS ASSOCIATED WITH ELECTROPHORETICALLY SEPARATED ANALYTES USING POST-ELECTROPHORESIS TREATMENT

(71) Applicant: ProteinSimple, San Jose, CA (US)

(72) Inventors: Kevin Tran, San Jose, CA (US);
Jessica Dermody, San Jose, CA (US);
Joshua I. Molho, Oakland, CA (US);
Surashree Kulkarni, San Jose, CA (US);
Annegret Boge, Menlo Park, CA (US)

(73) Assignee: ProteinSimple, San Jose, CA (US)

( * ) Notice: Subject to any disclaimer, the term of this patent is extended or adjusted under 35 U.S.C. 154(b) by 285 days.

(21) Appl. No.: 18/356,156

(22) Filed: Jul. 20, 2023

(65) Prior Publication Data

US 2024/0192164 A1  Jun. 13, 2024

Related U.S. Application Data

(63) Continuation of application No. PCT/US2022/013330, filed on Jan. 21, 2022.

(Continued)

(51) Int. Cl.
*G01N 27/447* (2006.01)
*G01N 1/40* (2006.01)
(Continued)

(52) U.S. Cl.
CPC ......... *G01N 27/44726* (2013.01); *G01N 1/40* (2013.01); *G01N 21/6486* (2013.01);
(Continued)

(58) Field of Classification Search
CPC .. G01N 27/44726; G01N 1/40; G01N 1/4044; G01N 21/6486; G01N 33/6854; G01N 2001/4038
See application file for complete search history.

(56) References Cited

U.S. PATENT DOCUMENTS 10,267,795 B2  4/2019  Herr et al.
2006/0240548 A1 * 10/2006  Deutsch ................ C12M 45/22
435/395

(Continued)

OTHER PUBLICATIONS

International Search Report and Written Opinion for International Application No. PCT/US2022/013330, dated Apr. 14, 2022, 9 Pages.

*Primary Examiner* — Luan V Van
*Assistant Examiner* — Shizhi Qian
(74) *Attorney, Agent, or Firm* — Casimir Jones, S.C.; Anne M. Reynolds (57) ABSTRACT

Some embodiments described herein relate to a method that includes wetting a microfluidic device with a sample containing biological cells. The chip can contain multiple wells. The sample can be allowed to "settle," such that individual cells migrate into and/or are captured by various wells. Analytes from the cells can be electrophoretically separated. A voltage can be applied across the chip causing analytes to migrate from the wells and into the separation medium under electromotive force, where they can be separated based, for example, on their mobility. After separation, a reagent can be applied to the chip. The reagent can be configured to increase a probe's ability to bind to at least a subset of the analytes and facilitate detection and/or quantification of the analytes. The analytes can then be probed, for example, with an antibody.

18 Claims, 5 Drawing Sheets

Related U.S. Application Data

(60) Provisional application No. 63/140,075, filed on Jan. 21, 2021.

(51) Int. Cl.
*G01N 21/64* (2006.01)
*G01N 33/68* (2006.01)

(52) U.S. Cl.
CPC . *G01N 33/6854* (2013.01); *G01N 2001/4038* (2013.01); *G01N 1/4044* (2013.01)

(56) References Cited

U.S. PATENT DOCUMENTS

| | | | | |
|---|---|---|---|---|
| 2008/0220442 A1* | 9/2008 | Liao | ................ | G01N 27/44726 |
| | | | | 435/7.1 |
| 2011/0062025 A1* | 3/2011 | Albrecht | .......... | G01N 27/44795 |
| | | | | 204/644 |
| 2014/0158537 A1* | 6/2014 | Herr | ....................... | G01N 30/00 |
| | | | | 204/603 |
| 2015/0316547 A1* | 11/2015 | Herr | ..................... | B01L 3/5085 |
| | | | | 506/40 |
| 2018/0217094 A1* | 8/2018 | Herr | ...................... | B01D 57/02 |

* cited by examiner

FIG. 1

Figure 2B
With post-electrophoresis treatment

Figure 2A
Without post-electrophoresis treatment

METHOD FOR ENHANCING SIGNALS ASSOCIATED WITH ELECTROPHORETICALLY SEPARATED ANALYTES USING POST-ELECTROPHORESIS TREATMENT

CROSS REFERENCE TO RELATED APPLICATION

This application is a continuation of International Patent Application No. PCT/US2022/013330 filed on Jan. 21, 2022, which claims priority to U.S. Provisional Patent Application 63/140,075, filed on Jan. 21, 2021, the entire disclosure of which is hereby incorporated by reference.

FIELD

Embodiments described herein generally relate to western-blot-style techniques for separating and analyzing analytes. Embodiments described herein are particularly well suited for enhancing signal-to-noise ratios in chip-based electrophoresis of the contents of a single cell.

BACKGROUND

The single-cell western is a powerful method to measure protein expression heterogeneity in cell populations. U.S. Pat. No. 10,267,795, the entire disclosure of which is hereby incorporated by reference, discloses systems and methods by which the contents of individual cells can be separated and analyzed. The Milo™ Single-Cell Western Platform is an instrument offered by ProteinSimple® that is capable of performing single-cell westerns.

According to known techniques, a microfluidic device (also referred to as a "chip") is wetted with a sample containing cells. The chip includes or defines an array of microwells formed in a thin polyacrylamide gel layer. The microwells are sized such that they are each configured to contain a single cell. The cells from the sample are allowed to settle into the wells, and cells not captured in the array of microwells are rinsed away. Then the array is exposed to a combination run buffer/lysing agent that rapidly lyses the captured cells. An electric field is than applied to cause cell lysate (e.g., proteins) to migrate from the single cell-containing microwells into the gel layer. The gel layer further includes a light-activated functional group. After the analytes are separated, the gel layer is exposed to a light source that activates the functional groups to covalently bond the separated proteins to the gel. The bound proteins are subsequently probed with a labeled immunoreagent(s) (e.g. antibod(ies)) and detected using immunofluorescence or any other suitable technique, thus providing information about protein size and immunoreactivity for each single-cell lysate.

Some proteins that are typically detected on standard western blots may not be easily detected on single-cell westerns, executed according to known methods. Therefore, it is desirable to find improvements to the known single-cell western methods that can enhance detection of proteins not easily detected using known methods.

DETAILED DESCRIPTION

Some embodiments described herein relate to a method that includes wetting a microfluidic device (also referred to as a "chip") with a sample containing biological cells. The chip can contain multiple wells, each of which has a size and a shape designed to hold a single cell. The sample can be allowed to "settle," such that individual cells migrate into and/or are captured by various wells. The sample, and any cells not captured by a well, can then be washed from the chip. Analytes from the cells can be electrophoretically separated. For example, the chip can contain a separation medium and be wetted with a buffer. A voltage can be applied across the chip causing analytes to migrate from the wells and into the separation medium under electromotive force, where they can be separated based, for example, on their mobility. After separation, a reagent can be applied to the chip. The reagent can be configured to increase a probe's ability to bind to at least a subset of the analytes and facilitate detection and/or quantification of the analytes. The analytes can then be probed, for example, with an antibody.

Some embodiments described herein relate to a method that includes electrophoretically separating analytes disposed in wells of a microfluidic device by applying a voltage across the microfluidic device while it is exposed to and/or wetted with a run buffer. The chip include a separation medium, such that when the voltage is applied, analytes within the wells migrate into a portion of the separation medium adjacent to the wells. After separation, a reagent can be applied to the chip. The reagent can be configured to increase a probe's ability to bind to at least a subset of the analytes and facilitate detection and/or quantification of the analytes. After applying the reagent, analytes can be immobilized in the separation medium, and the probe can be applied.

Some embodiments described herein relate to a method that includes lysing a cell (e.g. one cell) disposed in a microwell in, defined by, and/or surrounded by a separation medium. A voltage can be applied across the separation medium such that proteins from the cell migrate from the well and into and/or through the separation medium. The separation medium can be treated with a denaturant or other suitable reagent after applying the voltage and/or separating the proteins. The proteins can be immobilized within the separation medium. The separation medium can then be probed with a labeled immunoreagent configured to bind to a protein epitope and facilitate detection of proteins having that epitope. For example, the immunoreagent can include an optically detectable label (e.g., a fluorescent dye), can be detected via absorbance, can be detected via native fluorescence, be configured to bind to another (e.g., secondary) labeled immonoreagent, and so forth.

Figure 1:
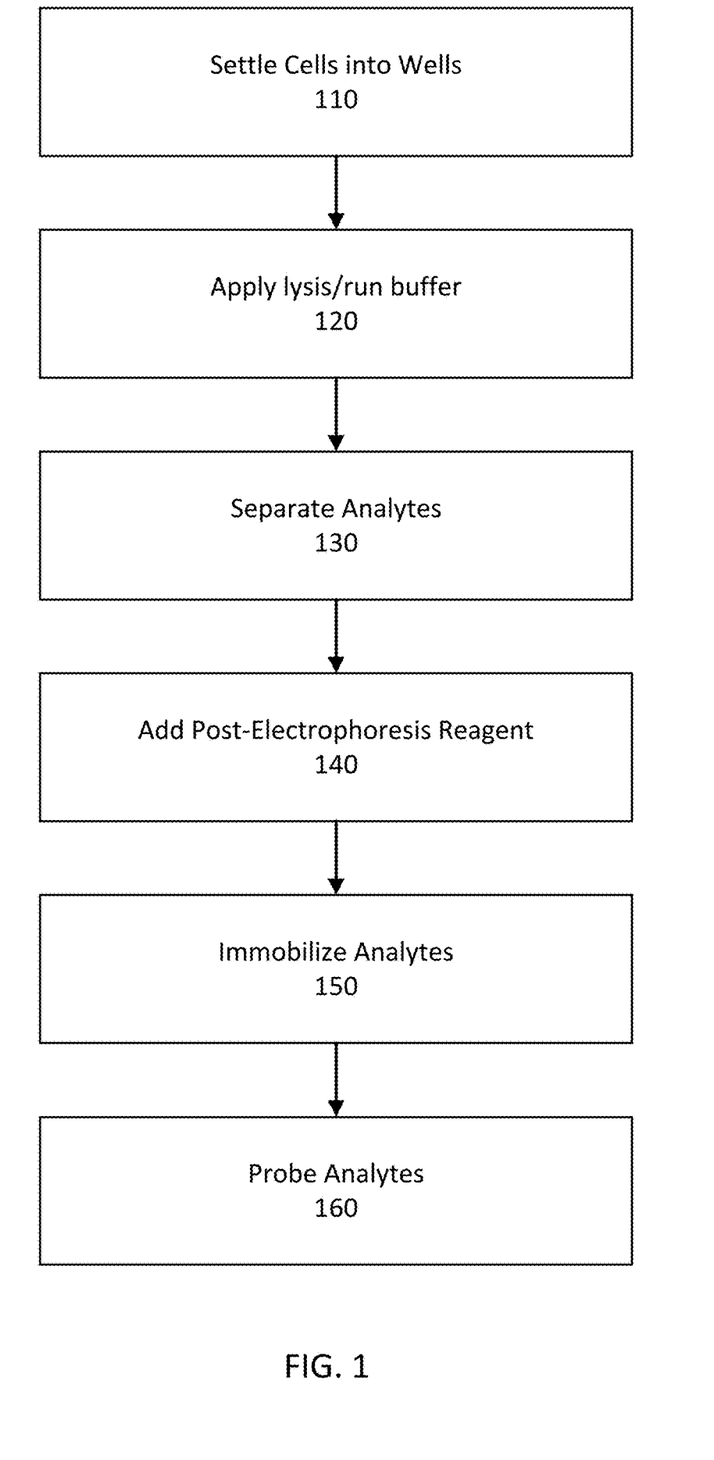
FIG. 1 is a flow chart of a method for performing single-cell westerns, according to an embodiment.

FIG. 1 is a flow chart of a method for performing single-cell westerns, according to an embodiment. At 110, a microfluidic device (e.g., a chip) can be wet by or otherwise exposed to a sample containing biological cells. The microfluidic device can include and/or define a series of wells. The wells can be microwells having, for example, a median diameter of 20-40 microns and/or a median volume of 5-100 pL. In other embodiments, the microwells can have a median diameter of 10-100 microns and/or a median volume of 1-1,000 pL. Each well can be configured to capture a single cell or cell-sized analyte-containing object, such as a bead. In this way, individual cells (or beads) can be isolated into individual wells, such that sample heterogeneity can be evaluated by performing immunoassays (or any other suitable type of assay) on the contents of each well. In some instances the settling can be gravity driven. In some other instances, the cells can have suitable properties that can be used to manipulate and/or guide the cells into specific wells using any suitable physical force. For example, cells (or select cells) can be exposed to capture binders that are magnetic or statically charged. In such instances, one or more magnetic or electric fields can be generated and used to guide the cells with magnetic and/or electric properties to the wells.

At 120, a lysing agent and/or run buffer can be applied to the chip. In some instances the run buffer—the buffer configured to conduct electricity through and across the chip during a separation stage—can contain a lysing agent. In other instances, a lysing agent that is distinct from the run buffer can be applied to the chip. The lysing agent can be configured to rupture the membranes of the cells disposed in the wells, liberating the analytes. The analytes are typically proteins, but can be any suitable cell content or other moiety that can be bound to a cell-like bead. Typically, lysis is carried out in less than 10 seconds and at ambient temperature.

At 130, the analytes can be separated. Separating the analytes can include applying an electric potential difference (i.e., voltage) across the chip such that the analytes are electrophoretically separated. The voltage induces an electric field that imparts an electromotive force on the analytes causing them to migrate from the wells into a separation medium adjacent to and/or surrounding the wells. For example, the chip can include a polyacrylamide gel layer into which the wells are formed. When the voltage is applied, analytes can migrate in the direction of the voltage (e.g., parallel to the plane of the chip; perpendicular to the axes of the wells) in lanes as shown, for example, in FIGS. 2A and 2B. The analytes can be separated by electrophoretic mobility, isoelectric point, or any other suitable parameter.

A post-electrophoresis reagent can be applied, at 140. The reagent can be a denaturant (i.e., a reagent operable to denature proteins) or any other suitable compound configured to increase a probe's ability to bind to at least a subset of the analytes. It is believed that in known single-cell western techniques, which do not include the addition of a post-electrophoresis reagent, certain proteins are not fully denatured and/or otherwise accessible the detection antibodies/probes. For example, as compared to traditional westerns, in which samples are typically denatured at high temperature (e.g., 70-100 degrees C.), high temperature denaturation is not feasible in some or all known single-cell western. In single-cell westerns, it is desirable or necessary that the cells remain intact until settled into the wells, which high-temperature denaturation before settling would prevent. Additionally, a high temperature denaturation step applied after settling would produce significant convective mixing and/or diffusion of analytes, dispersing the contents from wells and reducing the ability to distinguish contents from one well to another. Furthermore, in traditional westerns, reducing agents to break disulfide bonds are typically introduced. Such reagents, however, tend to increase the conductivity of buffers, and therefore may not be suitable for single-cell westerns where the increased heating of the chip may be detrimental to analyte separation and/or detection. In sum, according to known methods, proteins separated through known single-cell western techniques may be less completely denatured than the same proteins separated through traditional western techniques. The post-electrophoresis reagents described herein, therefore, increase the affinity between probes and analytes by, for example, further denaturing proteins. In addition or alternatively, the post-electrophoresis reagents may increase the capture of the separation medium. For example, as discussed in further detail below, the separation medium can be configured to immobilize the analytes. The post-electrophoresis reagents may be able to increase the capture efficiency of functional groups disposed within the separation medium, such that a larger percentage and/or quantity of analytes are captured and immobilized in the separation medium, and therefore a high concentration and/or quantity of analytes can be present for the probe to bind to, which can increase a signal associated with the probe. The post-electrophoresis reagents can otherwise be operable to modify the analytes and/or the separation medium to increase a signal associated with the probe and/or decrease background noise.

The post-electrophoresis reagent can be added to the run buffer, or the run buffer can be washed from the chip and the post-electrophoresis reagent can be applied to the chip. In some instances, it can be desirable to add the post-electrophoresis reagent only after separation, at 130, is complete as the post-electrophoresis reagent can have higher electrical conductivity than the run buffer and/or increase the electrical conductivity of the run buffer. Thus, adding the post-electrophoresis reagent before separation is complete can be detrimental to separation due to, for example, increased heating. It should be understood, however, that although referred to as a post-electrophoresis reagent, in some instances it may be possible to add the reagent before or during separation.

At 150, the analytes can be immobilized. For example, the separation medium can contain functional groups that, when activated, covalently bind to analytes. For example, the functional groups can be light activated and configured to bind to and immobilize proteins within the separation medium upon exposure to ultraviolet (UV) radiation.

At 160, the analytes can be probed. For example one or more probes (e.g., primary antibodies, aptamers, nanobodies, antibody derivatives, natural ligands, synthetic ligands, counter-structures, or other suitable moieties) can be applied to the chip to selectively bind to analytes, a subset of analytes, and/or specific locations of analytes. In some embodiments, secondary antibodies can be applied to the chip to bind to primary antibodies, including primary antibodies that are selectively bound to a subset of analytes and/or specific locations of analytes. The probe(s) can include a dye or other detectable marker. For example, the probe(s) can include a fluorescent dye or other suitable chemiluminescence agent configured to emit an optical signal such that the location and/or quantity of analytes to which the probe(s) are bound can be determined. For example, to detect a quantity and/or concentration of an analyte, the labeled immunoreagent can be excited such that it emits a fluorescent emission signal, which can be associated with the epitope to which the probe is configured to selectively bind and which can be detected by a camera or other suitable optical device. Other known labeling techniques, such as using enzyme to selectively deposit an opaque compound that is visually apparent or absorbs light, radiologically labeled probes, probes having detectable native fluorescent and/or absorbance characteristics, etc. can also be employed.

Figure 2A:
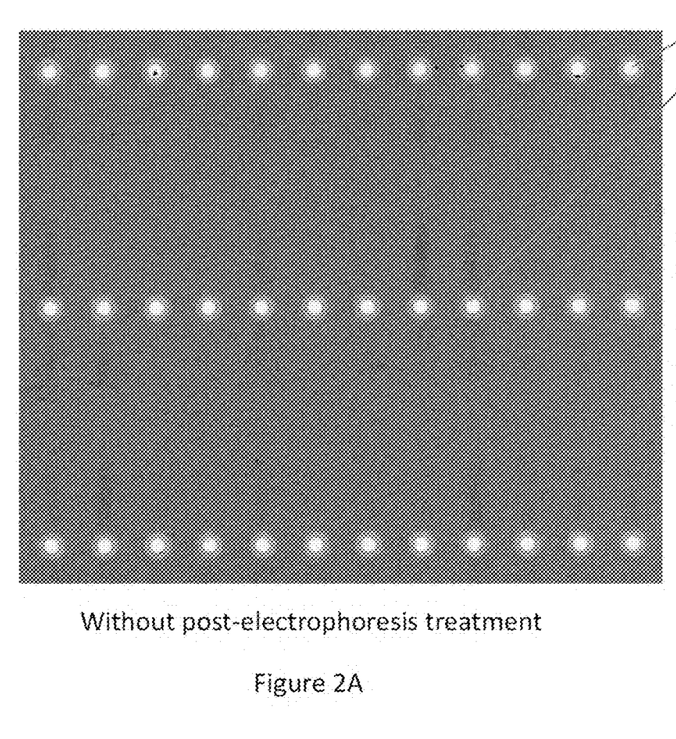
FIG. 2A is an image of a chip showing beta actin from single cells separated and probed, according to a known method.
Figure 2B:
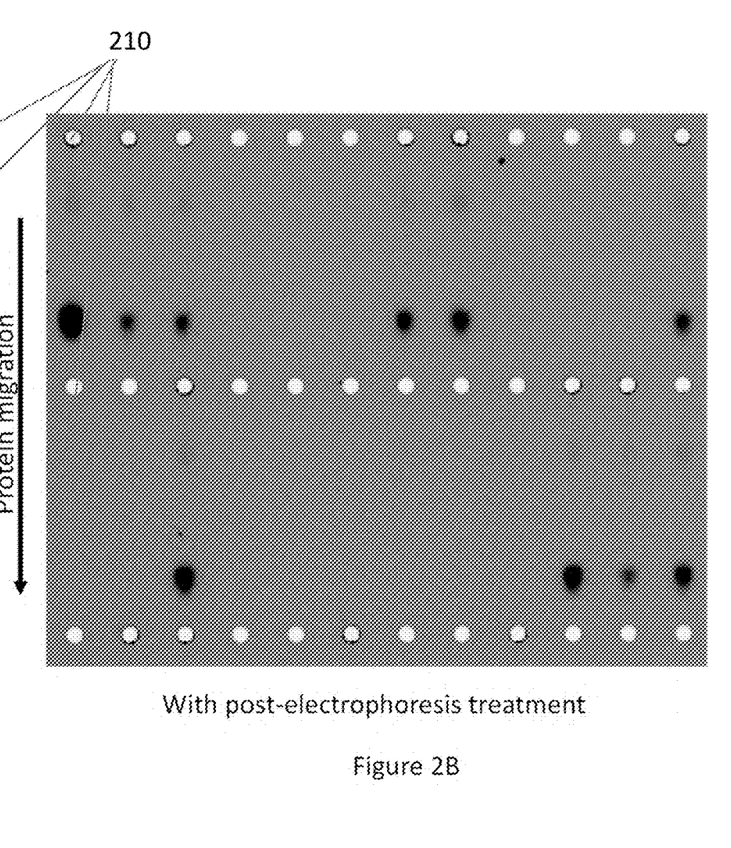
FIG. 2B is an image of a chip showing beta actin from single cells separated and probed, according to an example.

FIG. 2B is an image of a chip showing beta actin from single NALM cells separated and probed, according to the method described above with reference to FIG. 1. FIG. 2A is an image of a chip showing beta actin from single NALM cells separated and probed according to a known single cell western technique and did not include the application of a post-electrophoresis reagent. Each white circular region 210 is a well configured to capture a single cell. In the chips of each of FIGS. 2A and 2B, the microwells are arranged in vertical columns 200 microns apart and in horizontal columns 900 microns apart. Proteins from the cell were separated in a Milo instrument by applying a separation voltage of 240V across the chip for 75 seconds, such that the proteins moved from the wells into the separation medium. After separation and exposing the chips to UV radiation for four minutes to immobilize the analytes, a probe sensitive to beta actin was applied. Concentrations of probes selectively bound to beta actin is indicated by increased darkness. While beta actin is abundant in most cells, it is only weakly detected in FIG. 2A.

The chip shown in FIG. 2B, in contrast, was prepared by removing the 15 mL of lysis run buffer after electrophoresis and replaced with 15 mL of 0.25 M glycine HCl buffer (pH~2) before immobilizing the analytes. As compared to FIG. 2A, beta actin is much more strongly detected in FIG. 2B. Similarly stated, FIG. 2B demonstrates that the method shown and described with reference to FIG. 1 greatly increases the signal strength and/or signal-to-noise ratio of the probe used to detect beta actin.

Figure 3A:
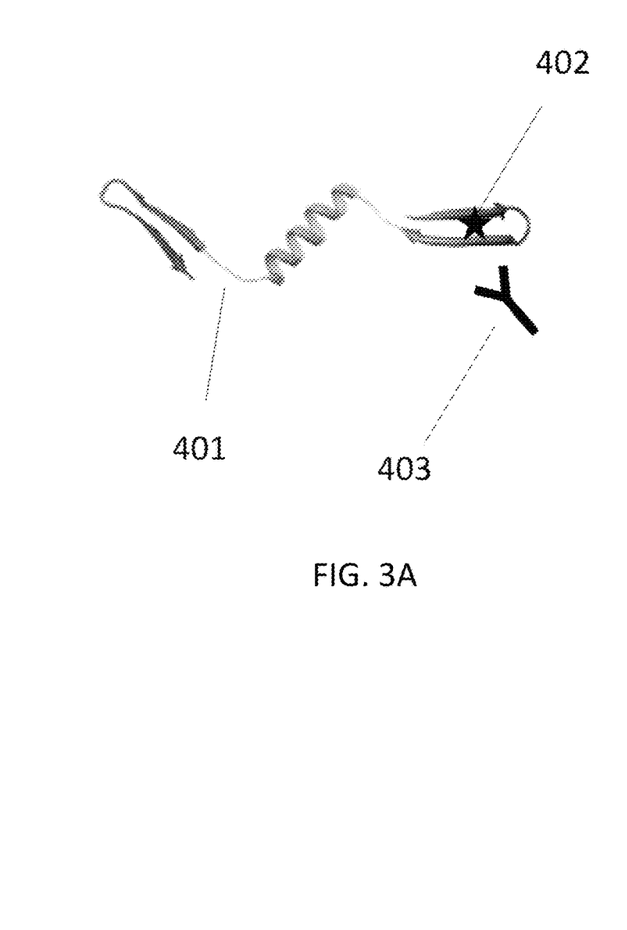
FIGS. 3A and 3B illustrate an example of a mode of action of the post-electrophoresis reagents described herein.

FIG. 3A illustrates an example of a mode of action of the post-electrophoresis reagents described herein. According to known single-cell western techniques, a protein 401 (e.g., some or all proteins in the sample) may not be fully denatured when the lysing agent is applied (e.g., at step 120). Once immobilized (e.g., at step 150), the configuration of the protein is frozen, and an epitope 402 to which the primary antibody 403 is configured to bind may not be accessible.

Figure 3B:
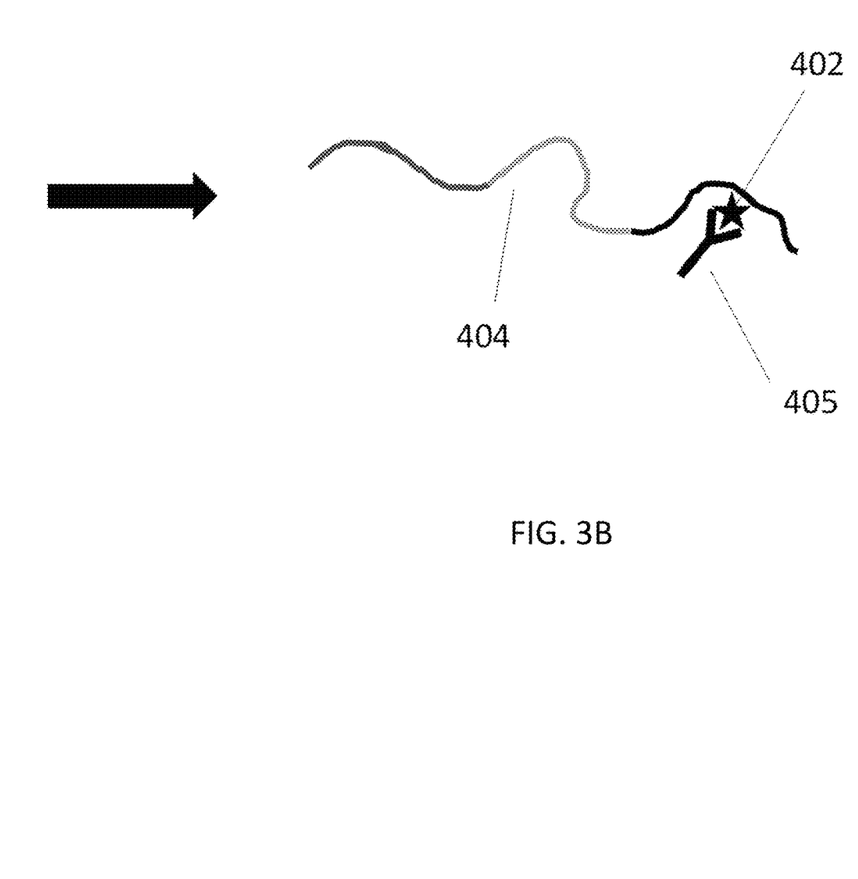

Applying a post-electrophoresis reagent, as described herein (e.g., at step 140), can more completely denature the protein 404, exposing the epitope, and increasing the affinity between the protein and the primary antibody, increasing incidents of binding 405.

Figure 4:
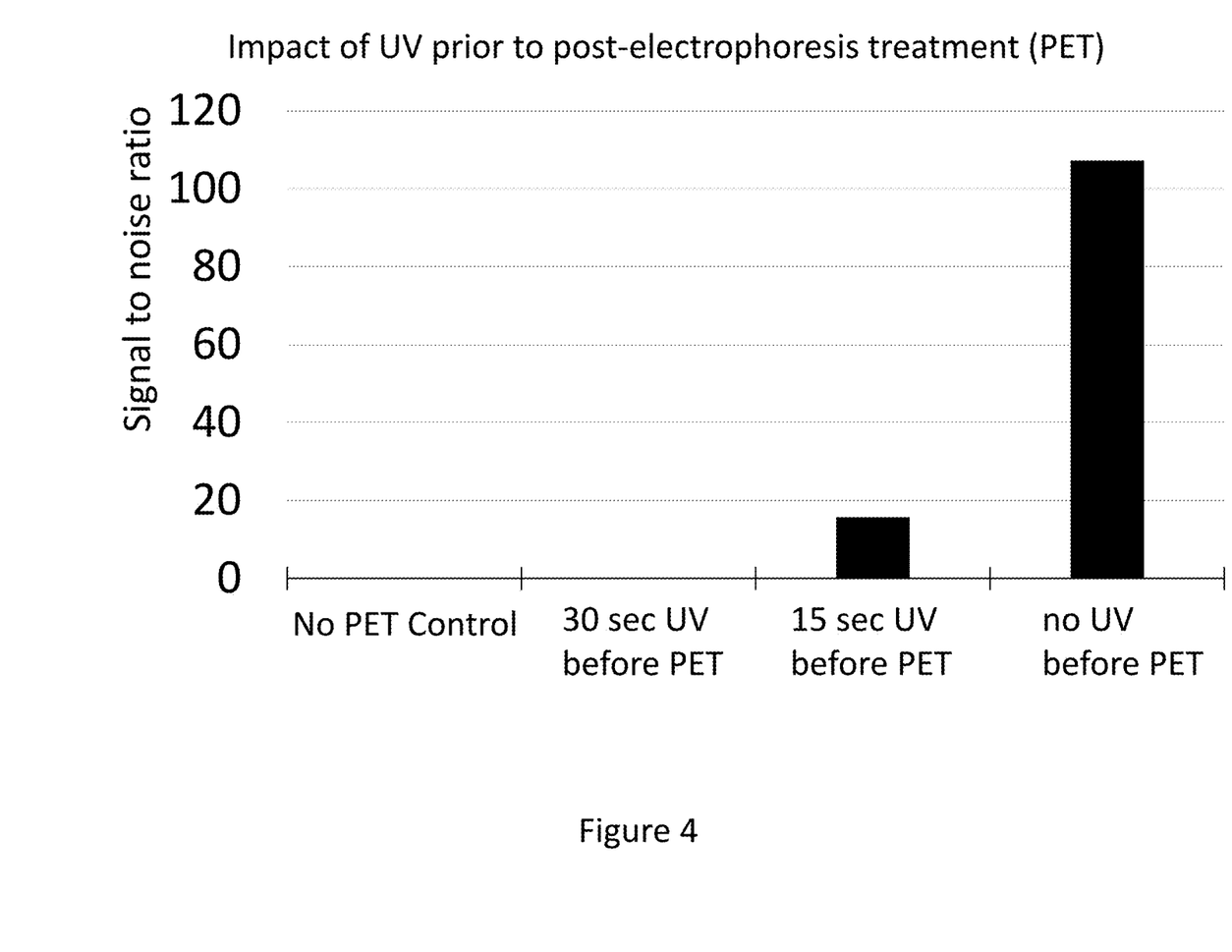
FIG. 4 illustrates the effect of signal-to-noise (SNR) ratio on the application of post-electrophoresis reagents and analyte immobilization, according to experimental data.

FIG. 4 illustrates the effect of signal-to-noise (SNR) ratio from the application of post-electrophoresis reagents (post-electrophoresis treatment (PET)) and analyte immobilization, according to experimental data. Because exposing the separation medium to UV light freezes the conformation of proteins, increasing the duration of UV exposure before a post-electrophoresis reagent is applied decreases the effectiveness of the post-electrophoresis treatment. Specifically, the SNR exceeded 100 when a post-electrophoresis reagent was applied before UV light was applied. However, with 15 seconds of UV exposure before the application of the post-electrophoresis reagent, the SNR drops to approximately 15, and with 30 seconds of UV exposure before the application of post-electrophoresis reagent, there is no specific signal that is distinguishable from noise, equivalent to no post-electrophoresis treatment. Accordingly, it is desirable to apply a denaturant or other suitable post-electrophoresis reagent to the chip before analytes are immobilized.

Embodiments described herein are able to increase the SNR of certain analytes (e.g., proteins) that have poor detectability when known single-cell western techniques are employed. For example, while beta actin appears in many cells with high abundance, when known single-cell western techniques are used, beta actin is not detected or only weakly appears, despite other proteins that typically occur in lower abundance (relative to beta actin) being readily detectable. Table 1 presents experimental data for various post-electrophoresis reagents and reagent solutions.

TABLE 1

| Post-Electrophoresis Reagent | pH | mean Peak Area (RFU * cm) | Mean SNR |
|---|---|---|---|
| 1M glycine HCl | 1.7 | 20.0 | 44.4 |
| 1M glycine HCl 125 mM Tris | 1.8 | 18.7 | 65.2 |
| 100 mM HCl | 2.0 (estimated) | 46.4 | 43.9 |
| 250 mM glycine HCl | 2.3 | 22.8 | 79.2 |
| 250 mM glycine HCl 32 mM Tris | 2.4 | 22.1 | 73.1 |
| 125 mM TCEP | 2.9 | — | — |
| 500 mM Acetic Acid | 3.1 | 17.9 | 29.9 |
| 1M glycine (free acid) | 8.0 | — | — |
| 250 mM glycine (free acid) | 8.2 | — | — |
| Commercial Milo lysis buffer | 8.6 (estimated) | — | — |
| 250 mM glycine (free acid) 32 mM Tris | 8.6 | — | — |
| 1M glycine (free acid) 125 mM Tris | 8.7 | — | — |

Experimental data suggests that glycine-HCl and HCl solutions are effective at increasing the SNR of certain proteins that are challenging to detect according to known single cell western techniques. Table 1 further demonstrates that mere run buffer replacement is not effective at increasing the detectability of beta actin and that the neutral/slightly basic reagents tested were not effective. IT may therefore be desirable for the post-separation reagent/buffer to have a pH below 4, and in some instances, below 3. Experiments in which basic Tris-glycine and glycine free acid generally did not increase the SNR of beta actin or produce detectable peaks.

Table 2 lists additional post-electrophoresis reagents effective for increasing the SNR for other target proteins, including beta tubulin (BTUB), GAPDH, AML1, and CASP7. The post-electrophoresis reagents listed in table 2 were effective at boosting the SNR for the identified targets by at least 20% relative to known methods, in which a post-electrophoresis reagent is not applied. Post-electrophoresis reagents identified in table 2 are effective to increase the SNR by lowering the background signal, increasing the peak area, or both. For example, TCEP solutions tend to lower the background signal relative to the control, and even though the detected peak area may not increase substantially, the resultant SNR improves. In contrast, 1 M glycine HCl solutions and pure HCl or HCl+KCl solutions tend to increase the background signal, but the peak area increases substantially more resulting in a higher SNR. Noise, as evaluated when calculating SNR in table 2 is different than the background (e.g., noise is the fluctuations around the background, but noise generally increases when the background increases). Finally, Table 2 also shows some cases where the post-electrophoresis treatment includes the addition of a reagent to the lysis/run buffer, rather than the removal of the lysis/run buffer and replacement with a post-electrophoresis reagent/buffer. For example, the addition of 5 mL of 1 M glycine HCl or 15 mL of 0.5 M glycine HCl to the existing 15 mL of lysis/run buffer resulted in increases of SNR by a factor of 7.8.

TABLE 2

| Target | Post-Electrophoresis Reagent | pH | Background vs. control | Peak Area vs. control | SNR vs. control |
|---|---|---|---|---|---|
| GAPDH | 0.5M Acetic Acid | 3.1 | 0.6 | 3.7 | 8.1 |
| BTUB | Add 15 mL 0.5M glycine HCl | not measured | 0.5 | 3.0 | 7.8 |
| BTUB | Add 5 mL 1M glycine HCl | not measured | 0.7 | 7.5 | 7.8 |
| BTUB | Replace with 30 mL 0.25M glycine HCl | ~2.5 | 0.8 | 3.3 | 6.8 |
| BTUB | 20 mM HCl + 100 mM KCl | 1.8 | 2.5 | 7.2 | 4.0 |
| BTUB | 0.25M glycine HCl | ~2.5 | 0.7 | 1.6 | 3.8 |
| GAPDH | 20 mM HCl + 100 mM KCl | 1.8 | 3.4 | 4.8 | 3.5 |
| GAPDH | Add 5 mL 1M glycine HCl | not measured | 0.8 | 2.1 | 2.8 |
| BTUB | 1M glycine HCl | 1.8 | 0.9 | 3.8 | 2.7 |
| GAPDH | Add 15 mL 0.5M glycine HCl | not measured | 0.9 | 1.6 | 2.5 |
| GAPDH | 1M glycine HCl mixed w/ Milo lysis buffer | 1.8 | 1.6 | 1.8 | 2.0 |
| BTUB | 1M glycine HCl | 2.1 | 1.2 | 5.4 | 1.8 |
| GAPDH | Replace with 30 mL 250 mM glycine HCl | ~2.5 | 3.6 | 2.1 | 1.8 |
| CASP7 | 125 mM TCEP | 2.9 | 0.49 | 1.0 | 1.5 |
| GAPDH | 1M glycine-HCl | 2.1 | 4.7 | 2.1 | 1.5 |
| GAPDH | 0.01 HCl | 2.1 | 1.8 | 1.5 | 1.4 |
| AML1 | 0.5M Acetic Acid | 3.1 | 0.6 | 0.9 | 1.3 |
| BTUB | 25 mM TCEP | 2.9 | 0.4 | 0.6 | 1.2 |

Figure 5:
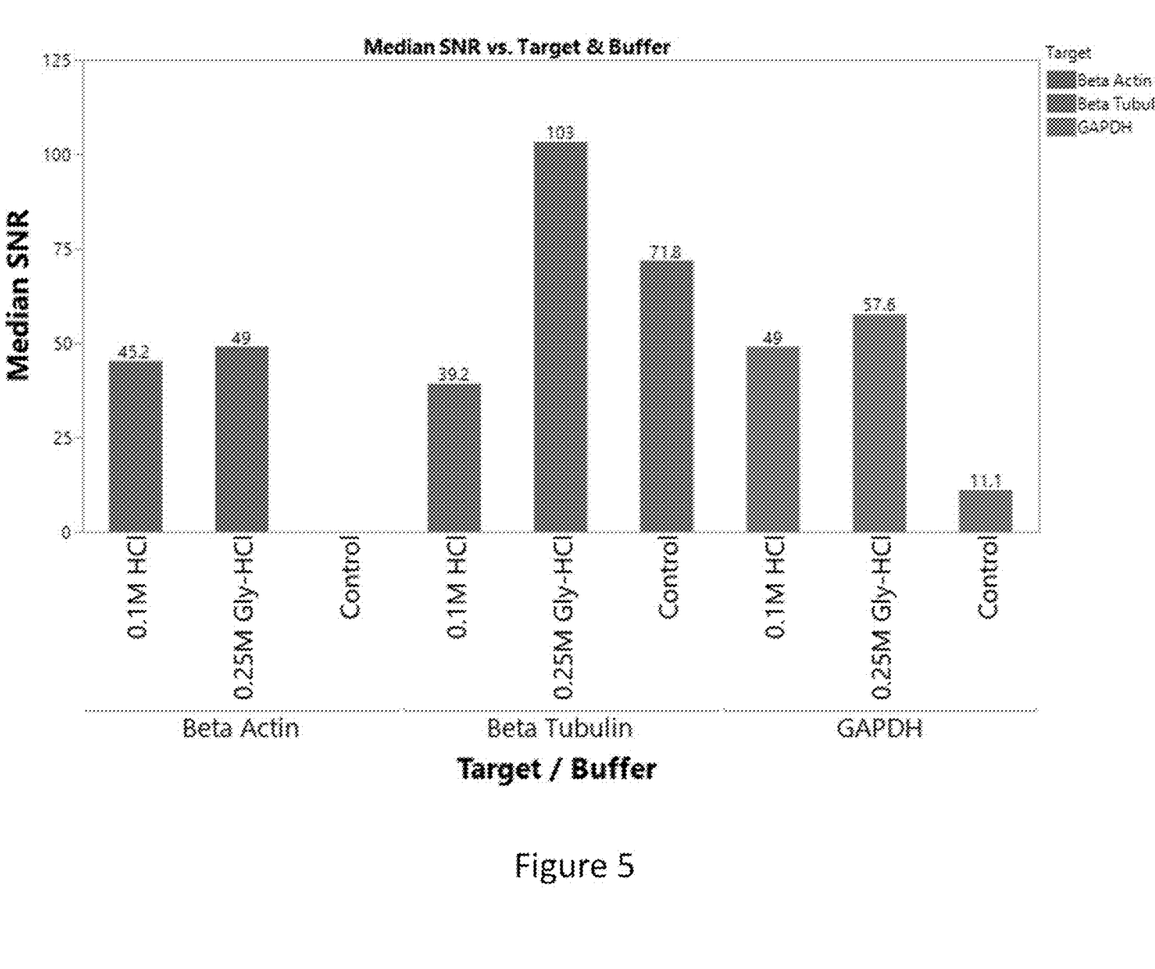
FIG. 5 depicts experimental data showing the SNR for beta actin, beta tubulin and GAPDH, for two post-electrophoresis treatments, and a control in which a post-electrophoresis reagent is not applied.

FIG. 5 depicts experimental data showing the SNR for beta actin, beta tubulin and GAPDH, for two post-electrophoresis treatments, and a control in which a post-electrophoresis reagent is not applied. The two treatments are 0.25 M glycine-HCl and 0.1 M HCl. In the case of beta actin, the control shows no detectable peaks, but the population median SNR increase ~50× with a post-electrophoresis treatment of either 0.25 M glycine-HCl or 0.1 M HCl. Beta tubulin and GAPDH were both detected in the control, with median beta tubulin SNR increasing with a post-electrophoresis treatment of 0.25 M glycine-HCl and decreasing slightly with 0.1 M HCl. The SNR for GAPDH increased significantly for both post-electrophoresis treatments.

While various embodiments have been described above, it should be understood that they have been presented by way of example only, and not limitation. For example, while embodiments described herein generally describe chip/microfluidic device-based techniques, it should be understood that any suitable electrophoretic techniques can be used.

Where schematics and/or embodiments described above indicate certain components arranged in certain orientations or positions, the arrangement of components may be modified. While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

As used herein, the term "analyte" refers to any molecule or compound to be separated via electrophoretic techniques and/or detected with the methods, apparatus and systems provided herein. Although embodiments described herein generally refer to protein analytes, it should be understood that any other suitable analyte may be detected according the methods described herein. For example, suitable analytes may include, but are not limited to, small chemical molecules such as, for example, environmental molecules, clinical molecules, chemicals, pollutants, and/or biomolecules. More specifically, such chemical molecules can include, but are not limited to pesticides, insecticides, toxins, therapeutic and/or abused drugs, antibiotics, organic materials, hormones, antibodies, antibody fragments, antibody-molecule conjugates (e.g., antibody-drug conjugates), antigens, cellular membrane antigen, proteins (e.g., enzymes, immunoglobulins, and/or glycoproteins), nucleic acids (e.g., DNA and/or RNA), lipids, lectins, carbohydrates, whole cells (e.g., prokaryotic cells such as pathogenic bacteria and/or eukaryotic cells such as mammalian tumor cells), viruses, spores, polysaccharides, glycoproteins, metabolites, cofactors, nucleotides, polynucleotides (comprising ribonucleic acid and/or deoxyribonucleic acid), transition state analogs, inhibitors, receptors, receptor ligands (e.g., neural receptors or their ligands, hormonal receptors or their ligands, nutrient receptors or their ligands, and/or cell surface receptors or their ligands), receptor-ligand complexes, nutrients, electrolytes, growth factors and other biomolecules and/or non-biomolecules, as well as fragments and combinations thereof. In some embodiments, the analyte is a protein or a protein complex, and the sample is a cellular lysate or a purified protein. Other suitable analytes can include aggregates, agglomerates, floc, and/or dispersed phase droplets or particles of colloids and/or emulsions. A separated analyte species can be referred to as a "band."

As used herein, the term "sample" refers to a composition that contains an analyte or analytes to be detected. A sample, in some embodiments, is heterogeneous, containing a variety of components (e.g., different proteins) or homogenous, containing one component (e.g., a population of one protein). Embodiments described herein generally refer to the analysis of a heterogeneous mixture of biological cells, in which individual cells are captured by wells of a microfluidic device. It should be understood, however, that the sample can contain any suitable composition of analytes. For example, analytes can be selectively bound to cell-sized beads. In such embodiments, a "lysis" step or lysis step analog could release the analytes from the beads.

In some instances, a sample can be naturally occurring, a biological material, and/or a manufactured material. Furthermore, a sample can be in a native (e.g., a cell suspension) or denatured form (e.g., a lysate). In some instances, a sample can be a single cell (or contents of a single cell, e.g., as a cellular lysate from the single cell, or a purified protein) or multiple cells (or contents of multiple cells, e.g., as a cellular lysate from the multiple cells, or a purified protein from the multiple cells), a blood sample, a tissue sample, a skin sample, a urine sample, a water sample, and/or a soil sample. In some instances, a sample can be from a living organism, such as a eukaryote, prokaryote, mammal, human, yeast, and/or bacterium or the sample can be from a virus.

What is claimed is:

1. A method, comprising:
   lysing a cell disposed in a microwell of a separation medium, comprising applying a combination run and lysis buffer to the separation medium;
   applying a voltage across the separation medium while the combination run and lysis buffer is in contact with the separation medium, such that proteins from the cell migrate through the separation medium;
   treating the separation medium with a denaturant to increase an ability of an antibody to bind to at least a subset of the proteins after applying the voltage;
   immobilizing the proteins within the separation medium after treating the separation medium with the denaturant; and
   probing the separation medium with the antibody, the antibody comprising an optically detectable label.

2. The method of claim 1, the method further comprising: washing away the combination run and lysis buffer before treating the separation medium with the denaturant.

3. The method of claim 1, wherein:
   the separation medium is a gel portion of a chip; and
   the microwell is from a plurality of microwells defined by the chip, each microwell from the plurality of microwells configured to contain one cell from a plurality of cells.

4. The method of claim 1, wherein:
   the separation medium is a gel portion of a chip;
   the microwell is from a plurality of microwells defined by the chip, each microwell from the plurality of microwells configured to contain one cell from a plurality of cells;
   the voltage is applied across the chip such that the proteins from the plurality of microwells migrate through portions of the gel associated with each microwell from the plurality of microwells.

5. The method of claim 1, wherein:
   the separation medium includes a light-activated functional group configured to bind to the proteins when activated; and
   immobilizing the proteins includes exposing the separation medium to UV light.

6. The method of claim 1, wherein:
   the separation medium is a gel portion of a chip;
   the microwell is from a plurality of microwells defined by the chip, each microwell from the plurality of microwells configured to contain one cell from a plurality of cells;
   the voltage is applied across the chip such that the proteins from the plurality of microwells migrate through portions of the gel associated with each microwell from the plurality of microwells; and
   immobilizing the proteins includes exposing the chip to UV light to immobilize the proteins that migrated from each of the plurality of microwells.

7. The method of claim 1, the method further comprising:
   exciting the optically detectable label; and
   detecting a fluorescent signal associated with a protein epitope in response to exciting the optically detectable immunoreagent label.

8. The method of claim 1, wherein the denaturant comprises glycine hydrochloride.

9. A method, comprising:
   electrophoretically separating analytes disposed in a plurality of wells of a microfluidic device wet by a run buffer by applying a voltage to the microfluidic device, the microfluidic device including a separation medium such that when the voltage is applied, the analytes migrate from at least a subset of wells of the plurality of wells into a portion of the separation medium adjacent each well from the subset of wells;
   removing the run buffer after electrophoretically separating the analytes;
   after removing the run buffer, applying a denaturant to increase an ability of a probe to bind to at least a subset of the analytes after separating the analytes;
   immobilizing the analytes in the separation medium; and
   exposing the analytes to the probe.

10. The method of claim 9, wherein each well from the plurality of wells is configured to contain one cell, the analytes being at least a portion of contents lysed from cells contained in the plurality of wells.

11. The method of claim 9, wherein each well from the plurality of wells is configured to contain one cell, the method further comprising:
   lysing cells disposed in wells from the plurality of wells, the analytes being at least a portion of contents lysed from the cells contained in the plurality of wells.

12. The method of claim 9, wherein the analytes are exposed to the probe after the denaturant is applied.

13. The method of claim 9, wherein the denaturant comprises glycine hydrochloride.

14. A method, comprising:
   wetting a microfluidic device with a sample containing a plurality of cells, the microfluidic device defining a plurality of wells, each well from the plurality of wells configured to capture one cell from the plurality of cells;
   washing cells from the plurality of cells that are not disposed in a well from the plurality of wells from the microfluidic device;
   lysing, after the washing step, each cell from a subset of the plurality of cells that is disposed in a well from the plurality of wells;
   electrophoretically separating analytes from at least a subset of wells from the plurality of wells that captured a cell such that the analytes migrate from the subset of wells from the plurality of wells into a separation medium of the microfluidic device;

removing lysate after electrophoretically separating the analytes;

applying a denaturant to increase an ability of a probe to bind to at least a subset of the analytes after separating the analytes and removing the lysate; and introducing the probe such that the probe binds to the at least the subset of the analytes.

15. The method of claim 14, wherein the analytes are proteins lysed from the subset of the plurality of cells.

16. The method of claim 14, further comprising immobilizing the analytes after applying the denaturant and before probing the analytes.

17. The method of claim 14, wherein probing the analytes includes introducing a labeled immunoreagent configured to selectively bind to a protein epitope of the at least the subset of the analytes.

18. The method of claim 14, wherein the denaturant comprises glycine hydrochloride.

\* \* \* \* \*